(No Model.) 2 Sheets—Sheet 1.
H. SAQUI.
FASTENER FOR DOORS.
No. 529,963. Patented Nov. 27, 1894.
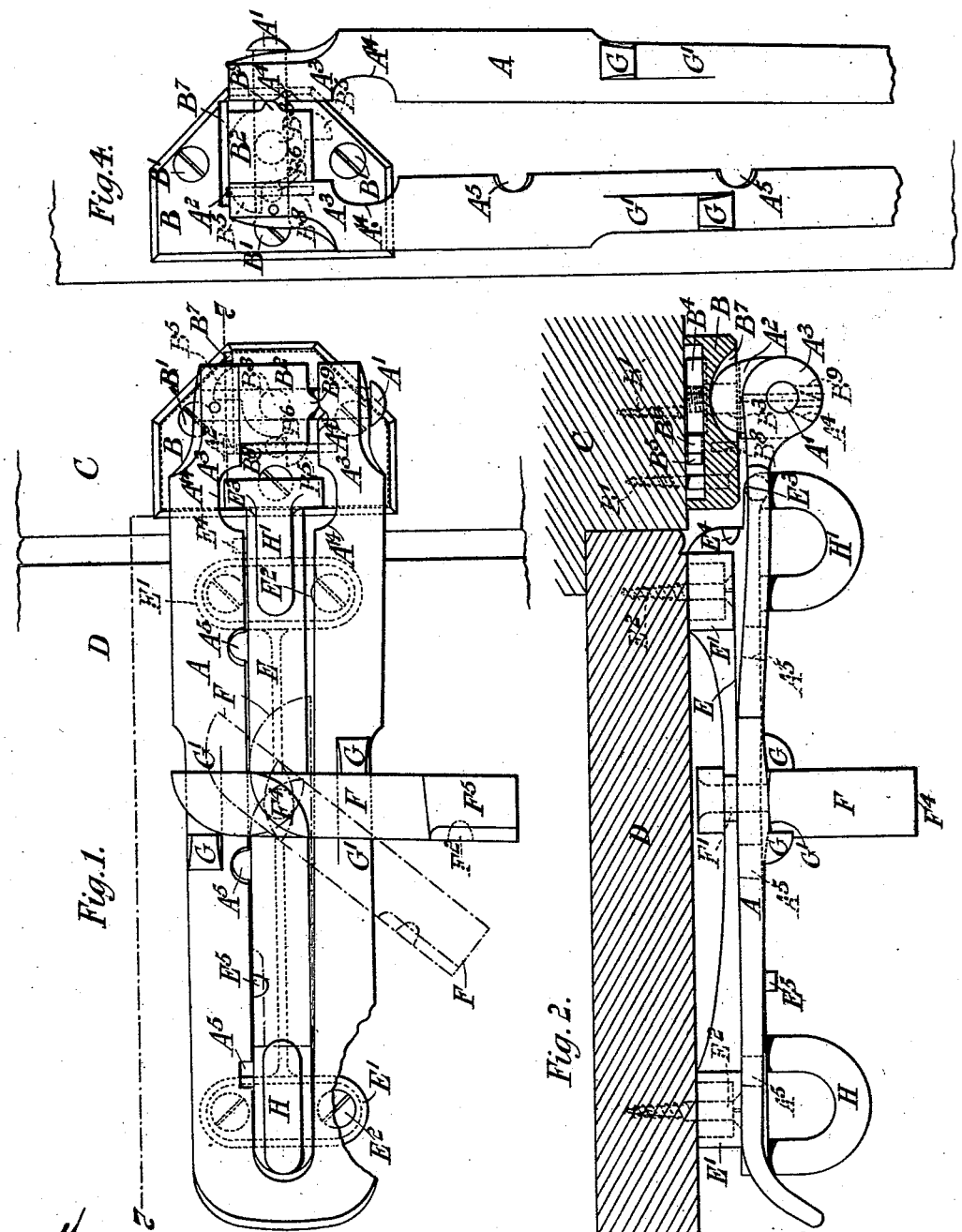
Witnesses:
H. K. Boulter.
C. J. Northup.
Inventor:
Horatio Saqui,
by Wm E. Poulter
his attorney (No Model.) 2 Sheets—Sheet 2.
H. SAQUI.
FASTENER FOR DOORS.
No. 529,963. Patented Nov. 27, 1894.
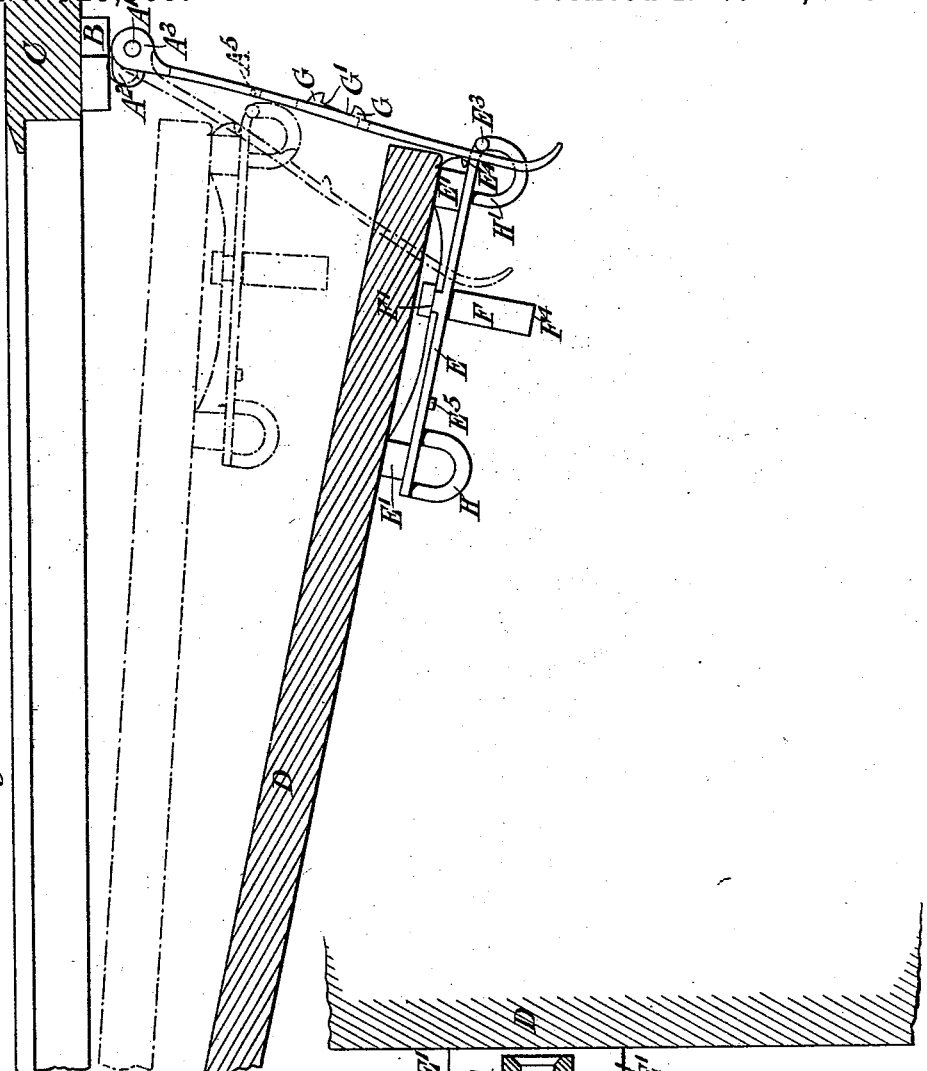
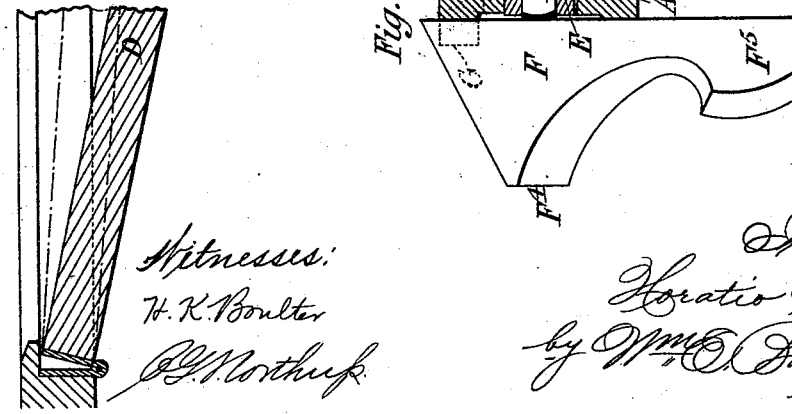

UNITED STATES PATENT OFFICE.

HORATIO SAQUI, OF LONDON, ENGLAND.

FASTENER FOR DOORS.

SPECIFICATION forming part of Letters Patent No. 529,963, dated November 27, 1894.

Application filed November 8, 1893. Serial No. 490,373. (No model.)

*To all whom it may concern:*

Be it known that I, HORATIO SAQUI, a subject of the Queen of England, residing at London, England, have invented certain new and useful Improvements in Bolts or Fasteners for Doors, Windows, and the Like, of which the following is a full, clear, and exact description.

This invention relates to a fastener for doors of various kinds, such as house-doors, railway-car doors, cabin-doors, and the like, and also window-sashes, &c., and is so designed that it may be used as a bolt for fastening the door entirely closed or may be employed for the same purpose as the well-known door-chain which allows the door to be opened to a certain extent but no farther.

The invention consists in the novel construction, arrangement and combination of parts as hereinafter fully described, illustrated in the drawings and pointed out in the appended claims.

In the accompanying drawings—Figure 1 is a face view of the complete device. Fig. 2 is a plan view of the same partly in section. Fig. 3 is a part sectional view of a portion of a door with the device attached. Fig. 4 is a face view showing the yoke turned so as to hang down vertically out of the way when not required for use. Fig. 5 is a sectional elevation, showing the cam button.

Referring to the above described drawings, A indicates a slotted plate or yoke pivoted at one end by the pin A' upon the bracket B secured to the door-frame C by screws B' or by other suitable means. The portion $B^2$ of the bracket B is arranged to turn to the extent of a quarter of a circle upon the fixed part B. The pin or spindle $B^3$ projecting from portion $B^2$ passes through a hole in bracket B in the hollow under side of which it carries the plate $B^4$ which may be secured to pin $B^3$ by riveting, screwing or otherwise so as to turn with said pin. The projecting points $B^5$ of plate $B^4$ alternately engage with the pin $B^6$ secured in the under side of the plate B and projecting into the hollow space. This arrangement allows the yoke A to be turned in one direction into the position shown in Fig. 1 and in the other direction at right angles thereto into the position shown in Fig. 4 in which latter position the yoke A is entirely clear of the door and the apparatus is not in use. In order to retain the yoke in either of these positions while allowing it the necessary play in that plane only, a flat lug or projection $A^2$ is provided upon one of the jaws $A^3$ at the open end of yoke A which engages with either of the slots $B^7$ or $B^8$ formed in the face of the bracket B. In Fig. 1 the lug $A^2$ is engaged in the slot $B^7$ and in Fig. 4 it is engaged in the slot $B^8$. The yoke A is thus carried entirely upon the door frame. The pivoted portion $B^2$ is provided upon one face with a projection $B^9$ and the appropriate jaw $A^3$ with a corresponding recess $A^4$ and the ends of the yoke A being sprung apart it will be seen that it has a tendency to lie at the particular angle in the horizontal plane due to the respective positions of the lug and the recess. The object of this is to insure the yoke always being in the proper position when the door is opened to insure the plate which the door carries properly entering the slot in the yoke.

Upon the door D is fixed a plate E screwed or otherwise secured to the door. In the drawings the plate E is shown with lugs E' through which pass the screws $E^2$ by which it is fixed to the door. Plate E has a T-head $E^3$ which when the door is opened and the end of the plate E is in engagement with the slot of the yoke A projects upon each side of A and prevents parts A and E from being separated. To enable the two parts to be disengaged when the door is closed recesses $A^{14}$ are formed in each arm of the yoke near its open end so that they can pass over the T-head $E^3$ and thus clear the yoke A from the plate E.

To fix the door open at certain points a stop $E^4$ is provided at the end of the plate E and recesses $A^5$ in the yoke A so that at these points the recess $A^5$ may slip over the lug $E^4$ and thus hold the two plates in engagement at those particular points.

The plate E carries the cam-button F which is pivoted at F' so as to turn freely. In the under side of the cam button is a recess $F^2$ adapted to fit over a stud or projection $E^5$ upon the plate E so that the cam button can only turn in one direction so far as to lie parallel with the plate E. The cam-button is so shaped at or toward the apex $F^4$ that supposing it to be hanging down vertically in the position of Fig. 1 by pressing the yoke upon it it will be turned into its horizontal position and then when the yoke is passed over it it will fall back again into a position approximately such as shown in dotted lines in Fig. 1, this movement being automatic by reason of the buttom being overbalanced the tail F⁵ being heavier than the other end. Upon the yoke A are two stops G against one or both of which the cam button bears when turned into the vertical position shown in Fig. 1; the faces G' of the yoke A which lead up to the stops G being inclined so that when the cam button is pressed home against the stop G it firmly holds A and E together, and can only be itself turned out of that position by the exercise of considerable pressure.

I have described the bracket B as being fixed upon the door frame and the plate E as being fixed to the door but these positions may be reversed if desired.

The operation of this apparatus is as follows:—Suppose the parts to be in the position indicated in Figs. 1 and 2. The door would be secured as by a bolt and could only be opened by the turning of the cam button F, into the horizontal position, and the lifting of the yoke over or past the cam button. This being effected, if the yoke A is allowed to rest where it naturally would under the influence of the spring regulators A⁴ and B⁹, and the door were opened it could only go as far as shown in Fig. 3 because the plate E would enter the slot in the yoke and the head E³ engaging the yoke upon each side of the slot would prevent the two parts from becoming detached and when the position shown in Fig. 3 was reached the door could not be opened farther and the apparatus would act in a manner similar to that of the ordinary chain. If when the cam button has been turned the plate A be turned back as far as it will go or at all events sufficiently far to entirely clear the plate E and its head E³ the door can be freely opened as the two parts A and E would be entirely separate. When this is required the yoke may be turned around and allowed to hang down as shown in Fig. 4, the lug A² then engaging with the slot B⁸ of the plate B and thus preventing the yoke from catching upon the door.

As a further security when the apparatus is to be locked the plate E may be provided at one or both ends with loops H, H' adapted to pass through the slot in the yoke A and by placing a padlock through one of these loops the door can be securely locked. If it be desired to lock the door in its open position of Fig. 3 a padlock may be placed through the loop H' behind the yoke A and the door then cannot be closed as the padlock will prevent the yoke from moving over the plate E.

As it is sometimes desired to place this device upon the outside of a door, say a street-door, it is desirable to be so able to fasten or lock it that it cannot be tampered with and also to so arrange it that the screws by which the parts are held to the door or framework cannot be removed until the apparatus is opened. For this purpose I may provide means of locking the parts which may be effected in various ways. For example, a hole may be made through the cam-button in any required part and through said hole a padlock may be placed so that even if the cam be turned the yoke cannot be lifted and the fastening is thus maintained; or one or more loops may be provided at any part or parts of the bracket plate and the padlock placed through as before; or, again, a lock may be placed within the button or locking plate in such a manner as to secure the parts, when the lock is placed in the cam it may be arranged to operate by preventing the cam from being turned at all. By securing the bracket plate by screws passing through lugs extending therefrom the lock may be arranged to cover these screws so that they cannot be got at until the yoke is lifted which cannot be done when the device is locked. Similarly the screws holding the yoke bracket upon the frame may be arranged so as to be covered by the yoke or other portion of the device. The screws however may be otherwise placed or arranged so long as they are protected when the device is closed.

To secure the screws on the bracket plate from being withdrawn when the yoke is lifted I may provide means whereby they are protected and I may preferably employ lugs in such position on the bracket plate with relation to loops thereon or to a hole or holes in the cam-button and handle thereof and when for example I employ a padlock through such loops or holes in the cam-button the screws in the lugs become thereby protected or I may employ other suitable locking devices whereby such screws are secured against tampering when protected by the yoke.

When using this as a simple fastener the yoke may if desired be dispensed with and a slotted plate secured upon one of the members to be fastened be slipped over the cam-button which then fastens itself as above explained.

When it is desired to prevent any absolute locking of a door altogether but only to provide against the door being opened farther than the bracket plate will slide in the slotted plate or yoke I may dispense with the cam-button and employ other suitable means when required. I may employ a spring or other suitable retaining device to hold the yoke in the required position but which will not prevent the door from being opened as far as the bracket plate will slide in the yoke and I may employ such spring or other devices in combination with or actuating a bell or other signal or alarm.

To prevent rattling of the door when fastened I may provide inclined surfaces upon the yoke where the cam-button bears upon it preferably with stops to prevent the button from turning too far.

What I claim, and desire to secure by Letters Patent, is—

1. The combination with a pivoted slotted yoke having a swinging movement in both a vertical and a horizontal plane, of a plate adapted to engage said yoke, a locking lever or button adapted to pass through the slot of the yoke, and stops carried by the yoke on opposite sides of its slot with which stops the lever or button is adapted to engage as and for the purpose specified.

2. The combination with a pivoted yoke having a swinging movement in both a vertical and a horizontal plane, of a plate provided with a stud or projection and adapted to engage with the yoke, a locking lever or button for the yoke and plate and carried by the latter and having upon its under side a recess adapted to be engaged by said stud, as and for the purpose specified.

3. The combination with a bracket comprising a fixed and a pivoted portion, of a yoke pivoted to the bracket and having a swinging movement in both a vertical and a horizontal plane, a pin carried by the pivoted portion of the bracket and passing through the fixed portion, a plate secured to said pin and having projecting points, and a pin carried by the fixed portion of the bracket and adapted to be engaged by said points, as and for the purpose specified.

4. The combination with a bracket comprising a fixed and a pivoted portion, of a yoke pivoted to the bracket, and having a swinging movement in both a vertical and a horizontal plane, a pin carried by the said pivoted portion and passing through the fixed portion, a plate secured to said pin and having projecting points, a pin carried by the fixed portion and adapted to be engaged by the said points, a lug on the yoke, and slots in the bracket with which slots the said lug is adapted to engage as and for the purpose specified.

5. The combination with a bracket comprising a fixed and a pivoted portion, of a yoke pivoted to the bracket and having a swinging movement in both a vertical and a horizontal plane, a pin carried by the pivoted portion of the bracket and passing through the fixed portion, a plate secured to said pin and having projecting points, a pin carried by the fixed portion of the bracket and adapted to be engaged by said points, a projection on the pivoted portion of the bracket and a corresponding recess in the yoke adapted to engage said projection, as and for the purpose specified.

6. The combination with a door frame, a bracket carried thereby, a rotatable portion $B^2$ of said bracket adapted to turn on the fixed part thereof, a spindle $B^3$ projecting from the portion $B^2$ and carrying a plate $B^4$, points or spurs on said plate, a pin $B^6$ secured to the bracket and adapted to engage said spurs and a slotted yoke pivoted to the rotatable portion of the bracket and adapted to swing in both a vertical and a horizontal plane, of a plate carried by a door and adapted to engage within the slot of the yoke, as described.

7. The combination with a door frame, a bracket carried thereby, a rotatable portion $B^2$ of said bracket adapted to turn on the fixed part thereof, a spindle $B^3$ projecting from portion $B^2$ and carrying a plate $B^4$, points or spurs on said plate, a pin $B^6$ secured to the bracket, and adapted to engage said spurs, and a slotted yoke pivoted to the rotatable portion of the bracket and adapted to swing in both a vertical and a horizontal plane, a projection $A^2$ on one of the jaws of the yoke, and the bracket being provided with slots $B^7$ $B^8$, with which said projection $A^2$ is adapted to engage when in its vertical or horizontal position, of a plate carried by a door, and adapted to engage within the slot of the yoke as described.

8. The combination with a door frame, a bracket carried thereby, a rotatable portion $B^2$ of said bracket adapted to turn on the fixed part thereof, a spindle $B^3$ projecting from portion $B^2$ and carrying a plate $B^4$, points or spurs on said plate, a pin $B^6$ secured to the bracket, and adapted to engage said spurs, and a slotted yoke pivoted to the rotatable portion of the bracket and adapted to swing in both a vertical and a horizontal plane, a projection $B^9$ on the face of portion $B^2$ of the bracket adapted to engage within a recess $A^4$ in the yoke, of a plate carried by a door and adapted to engage within the slot of the yoke as described.

9. The combination with a door frame, a bracket carried thereby, a rotatable portion $B^2$ of said bracket adapted to turn on the fixed part thereof, and a slotted yoke pivotally connected with the portion $B^2$ and adapted to swing in both a vertical and a horizontal plane, of a plate carried by a door and adapted to engage with the slot of the yoke, and a stop carried by the said plate, and adapted to engage within recesses $A^5$ in the yoke, as described.

In testimony whereof I have hereto set my hand in the presence of the two subscribing witnesses.

HORATIO SAQUI.

Witnesses:
GEO. M. FRANKLIN,
JOSEPH LAKE.